(12) United States Patent
Tseng et al.

(10) Patent No.: US 7,724,636 B2
(45) Date of Patent: May 25, 2010

(54) ASYMMETRY COMPENSATOR FOR PARTIAL RESPONSE MAXIMUM LIKELIHOOD (PRML) DECODER

(75) Inventors: Chien-Fu Tseng, Hsinchu (TW); Yung-Chi Yang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 784 days.

(21) Appl. No.: 11/180,691

(22) Filed: Jul. 14, 2005

(65) Prior Publication Data

US 2006/0198469 A1   Sep. 7, 2006

(30) Foreign Application Priority Data

Mar. 2, 2005   (TW) .................................. 94106316

(51) Int. Cl.
*G11B 7/00* (2006.01)
(52) U.S. Cl. .................................... 369/124.1; 375/262
(58) Field of Classification Search ................ 375/262; 369/124.1, 59.15, 59.21
See application file for complete search history.

(56) References Cited

U.S. PATENT DOCUMENTS

| | | | |
|---|---|---|---|
| 6,324,144 B1 | 11/2001 | Won et al. | |
| 6,324,231 B1 * | 11/2001 | Huang | ........................ 375/346 |
| 6,449,110 B1 | 9/2002 | DeGroat et al. | |
| 6,483,793 B1 | 11/2002 | Kim | |
| 6,693,863 B2 | 2/2004 | Shoji et al. | |
| 6,754,160 B2 | 6/2004 | Kashihara et al. | |
| 6,798,363 B2 | 9/2004 | Rapp | |
| 7,190,184 B2 | 3/2007 | Haji-Sheikh et al. | |
| 7,215,631 B2 | 5/2007 | Horibe et al. | |
| 2003/0169665 A1 | 9/2003 | Miyashita et al. | |
| 2004/0150456 A1 * | 8/2004 | Radice et al. | ............... 327/334 |
| 2005/0024076 A1 | 2/2005 | Haji-Sheikh et al. | |
| 2005/0141378 A1 * | 6/2005 | Tatsuzawa et al. | ......... 369/53.2 |
| 2005/0180298 A1 * | 8/2005 | Horibe et al. | ............ 369/124.1 |
| 2005/0254401 A1 * | 11/2005 | Goossens | ............... 369/124.01 |

FOREIGN PATENT DOCUMENTS

WO    WO 03/017335    2/2003

(Continued)

OTHER PUBLICATIONS

Masaki Kagawa, et al., "A Study of Asymmetry Compensation for Partial-Response Maximum-Likelihood Detection in Optical Recording Media," Jpn. J. Appl. Phys. vol. 37 (1998) pp. 2214-2216 Part 1, No. 4B, Apr. 1998.

(Continued)

*Primary Examiner*—David C Payne
*Assistant Examiner*—Tanmay K Shah
(74) *Attorney, Agent, or Firm*—Harness, Dickey & Pierce, P.L.C.

(57) ABSTRACT

An asymmetry compensator for a partial response maximum likelihood (PRML) decoder, which is utilized to remove and eliminate the asymmetric component of the regenerating signal read from the optical recording medium, thereby effectively solving the problem of the asymmetry of the optical disk regenerating signal. The compensator includes an offset controller and a gain controller. The offset controller determines the central level of the regenerating signal thus to adjust the offset of the regenerating signal while the gain controller is arranged to adjust the gain of the regenerating signal.

12 Claims, 13 Drawing Sheets

FOREIGN PATENT DOCUMENTS

WO     WO 2004/061845     7/2004

OTHER PUBLICATIONS

Belkacem Derras, "Decision-Directed Adaptive Nonlinear Canceller for Optical Read Channels," IEEE Transactions on Consumer Electronics, vol. 47, No. 3, August 2001.

Shintaro Takehara, et al., "Combined adaptive controlled PRML signal processing for high-density optical disk." 2002.

O. Kawamae, et al. "Adaptive Signal Processing Method Using PRML for HigH Density Optical Disks." 2002.

Naoki Ide, "Adaptive Partial-Response Maximum-Likelihood Detection in Optical Recording Media." 2002.

* cited by examiner

ASYMMETRY COMPENSATOR FOR PARTIAL RESPONSE MAXIMUM LIKELIHOOD (PRML) DECODER

This application claims the benefit of Taiwan Patent Application No. 94106316, filed on Mar. 2, 2005, which is hereby incorporated by reference for all purposes as if fully set forth herein.

BACKGROUND OF THE INVENTION

1. Field of Invention

The invention relates to an asymmetry compensator, and in particular to an asymmetry compensator, which can be utilized in a Partial Response Maximum Likelihood (PRML) Decoder for adjusting the gains and the offsets of asymmetric components of the regenerating signal read from an optical recording medium.

2. Related Art

In general, the optical recording medium is utilized to record the data on the disk by optical means, and to read the data stored on the disk by optical means. As such, the device utilized to read the data stored on the optical recording medium is usually referred to as a signal regenerating device, it mainly comprises: a read/write head for reading/writing the data, a preamplifier, a waveform equalizer, a data detecting circuit, and a decoder.

Usually, in reading the data stored on the optical recording medium, the value of the data is determined by the size of the burned area. However, when the burned area is exceeding 'large' or exceeding 'small', the distinct asymmetry will appear in the optical disk regenerating signal, which affects the error occurrence rate of the regenerating signal of the optical disk, for example, PRSNR, SbER, which is utilized as an important indicator for indicating the optical disk error rates. Among them, PRSNR is disclosed by NEC, SbER is disclosed by Toshiba of Japan respectively.

U.S. Pat. No. 6,324,144 discloses a technology of eliminating the asymmetry, wherein the difference of numbers of the positive and negative signal is utilized to adjust the offset of the regenerating signal. However, to PRML, the adjustment of the offset is not able to entirely compensate the asymmetry in the signal. In addition, if this asymmetry were severe, the application of this technology would increase the difficulties in discriminating the signal.

U.S. Pat. No. 6,754,160 discloses another technical means, wherein the offset is obtained by comparing the signal of PRML with the regenerating signal of the optical disk. However, this means is less sensitive to the offset, and it needs additional hardware to record the regenerating signals, thus increasing the hardware complexity and expense.

U.S. Pat. No. 6,798,363 discloses another technical means, wherein in addition to adjusting the offset by the difference of numbers of the positive and negative signal, the offset is further adjusted by the symmetry of the short T signal. However, to the PRML, the adjustment of the offset alone is not capable of compensating the asymmetry entirely, for it needs the signal of the Viterbi decoder as the feedback signal, thus making the realization of the hardware even more difficult.

U.S. Pat. No. 6,693,863 discloses another technical means, in which the compensation of the asymmetry is achieved by adjusting the quantified level of A/D. However, the utilization of the analog circuit tends to have the problem of adjustment difficulties.

In addition, in the early open published No. 20030169665 discloses a technology, which is utilized to integrate the gain adjuster and the equalizer as a single unit, thus to reduce the hardware required, and the gain is adjusted by making use of the Viterbi feedback signal. However, the integration of gain adjuster and equalizer as a single unit increases the complexity of the circuit design, yet the offset has not been adjusted.

In other documents related to this subject, for example, as disclosed in "A study of Asymmetry Compensation for Partial-Response Maximum-Likelihood Detection in Optical Recording Media" (Sony paper, 1998), the offset of the signal is obtained by making use of the successive 6T, and then it is transmitted to the Viterbi decoder. However, the signals of succession are required, when it is not the case, then the correct offset can not be obtained. In another related document "Decision-directed adaptive nonlinear canceller for optical read channels" (Cirrus paper, 2001) is disclosed a technical means, the compensation signal output is obtained through the equations, yet in this process a set of predetermined input digital signals are required. In other related documents, for example, "Adaptive Signal Processing Method Using PRML For High Density Optical Disks" (Hitachi Ltd. 2002 IEEE), "Combined adaptive controlled PRML signal processing for high density optical disk" (Toshiba Corp. 2002 IEEE), "Adaptive Partial-Response Maximum-Likelihood Detection in Optical Recording Media" (Sony Corp. 2002 IRRR), the asymmetry of the RF (optical disk regenerating signal) is disclosed, and the solution of the asymmetry is by varying the level of the maximum-likelihood decoder. However, by doing so other problems are derived and have just yet to be solved, such as the convergence, the stability, and the interval between level and level of the optical disk regenerating signal.

To solve the asymmetry problem of the optical disk regenerating signal, the adjustment of the offset or the adjustment of the gain is utilized in the prior art, yet the asymmetry correction of the signal must be achieved by offset adjustment and gain adjustment simultaneously, as such to obtain the correct and precise regenerating signal. Nevertheless, for this problem, the prior art does not have proper solution.

SUMMARY OF THE INVENTION

In view of the above-mentioned problems and shortcomings of the prior art, the invention is directed to an asymmetry compensator for a partial response maximum likelihood (PRML) decoder, thus solving the problem of asymmetry of the signal regeneration of the optical disk, increasing the signal decoding rate, as such solving the problems and the shortcomings of the prior art.

Therefore, the asymmetry compensator for the partial response maximum likelihood (PRML) decoder disclosed by the invention is utilized to eliminate the asymmetric portion of the regenerating signal read from an optical recording medium, including an offset controller and a gain controller. Said offset controller is used to determine the central level of the regenerating signal, thereby adjusting the offset of the regenerating signal, while said gain controller is used to adjust the gain of the regenerating signal.

According to one aspect of the invention, the asymmetric compensator disclosed by the invention can be used to effectively improve the asymmetry of the regenerating signal.

According to another aspect of the invention, the asymmetric compensator disclosed by the invention can be used to adjust the offset and gain simultaneously.

According to a further aspect of the invention, the asymmetric compensator disclosed by the invention can be used so that the regenerating signal does not have to go through the phase lock loop first, thereby improving the effectiveness of the phase lock loop.

According to yet another aspect of the invention, the asymmetric compensator disclosed by the invention can be used so that the offset controller is capable of solving the problem which is liable to be missed with the channel 2T by means of blue light.

According to a further aspect of the invention, the asymmetric compensator disclosed by the invention is easy to realize hardware-wise, easy to debug, thus reducing its hardware requirement.

According to yet a further aspect of the invention, the asymmetric compensator disclosed by the invention has excellent convergence, so the feedback signal from some other devices is not needed.

According to a further aspect of the invention, the asymmetric compensator disclosed by the invention can be fully digitalized and have high stability, so that the signal quality is improved and thus it will not deteriorate.

In the following description, for purposes of explanation numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

BRIEF DESCRIPTION OF THE DRAWINGS

The above and other objects, features and other advantages of the invention will be more clearly understood from the following detailed description when taken in conjunction with the accompanying drawings, and wherein.

DETAILED DESCRIPTION OF THE INVENTION

Reference will now be made in greater detail to a preferred embodiment of the invention, an example of which is illustrated in the accompanying drawings. Wherever possible, the same reference numerals are used throughout the drawings and the description to refer to the same or like parts. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
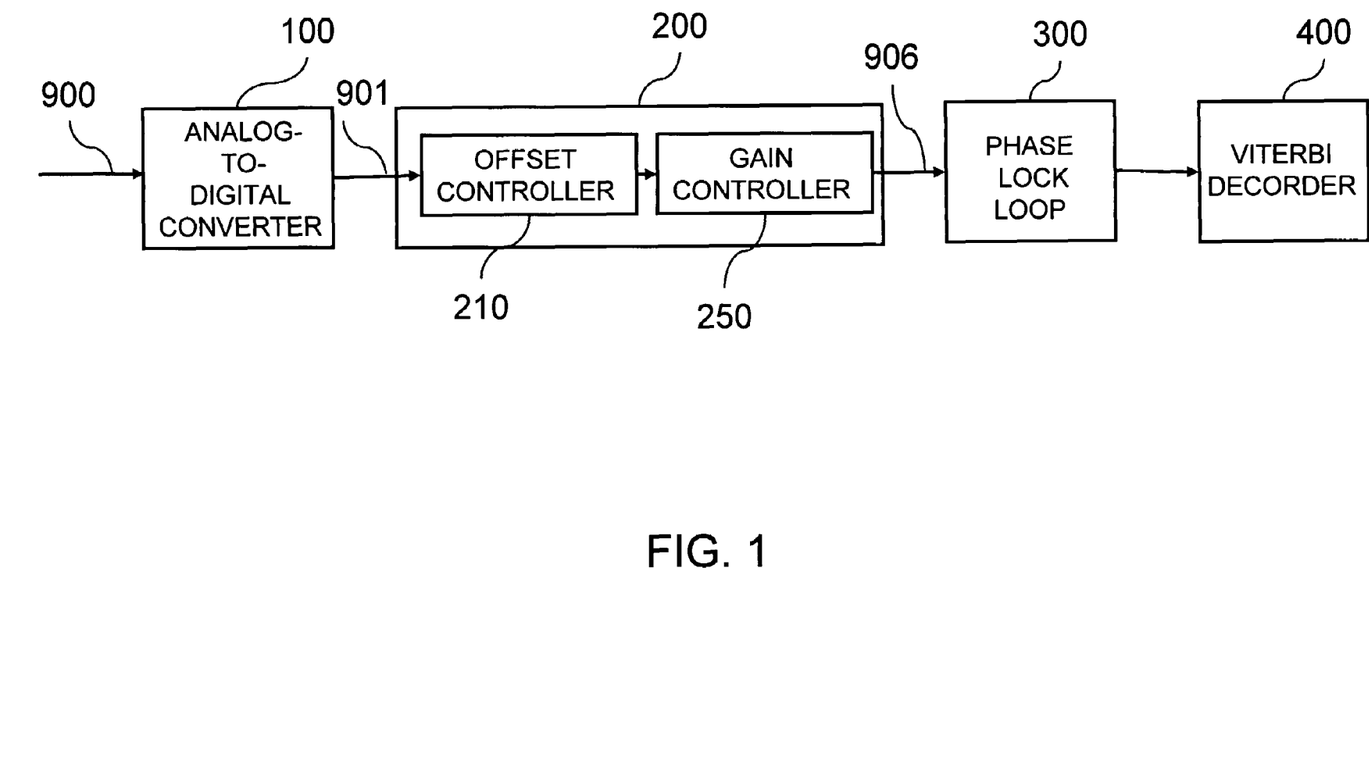
FIG. 1 is a system block diagram of the asymmetry compensator for partial response maximum likelihood (PRML) decoder according to the first embodiment of the invention.

Refer to FIG. 1 for the system block diagram of the Asymmetry Compensator for Partial Response Maximum Likelihood (PRML) Decoder according to the first embodiment of the invention.

As shown in FIG. 1, it shows the system structure of the Partial Response Maximum Likelihood (PRML) Decoder, including: an analog-to-digital converter 100, an asymmetric compensator 200, a phase lock loop 300, and a VETERBI decoder 400. Firstly, the analog-to-digital converter 100 is utilized to convert the regenerating signal 900 read from the optical recording medium. The regenerating signal 900 read from the optical recording medium is of an analog format, which is converted to the regenerating signal 901 of a digital format through the analog-to-digital converter 100. Then the regenerating signal 901 is removed from the asymmetric component through the asymmetric compensator 200. Subsequently, the regenerating signal 906, not having the asymmetric component, is phase locked by making use of the phase lock loop 300. And finally, the regenerating signal 906 is decoded through the VITERBI decoder 400.

In the above description, the asymmetric compensator 200 is composed of an offset controller 210 and a gain controller 250, which can be used to eliminate the asymmetric component of the regenerating signal 901.

Figure 2:
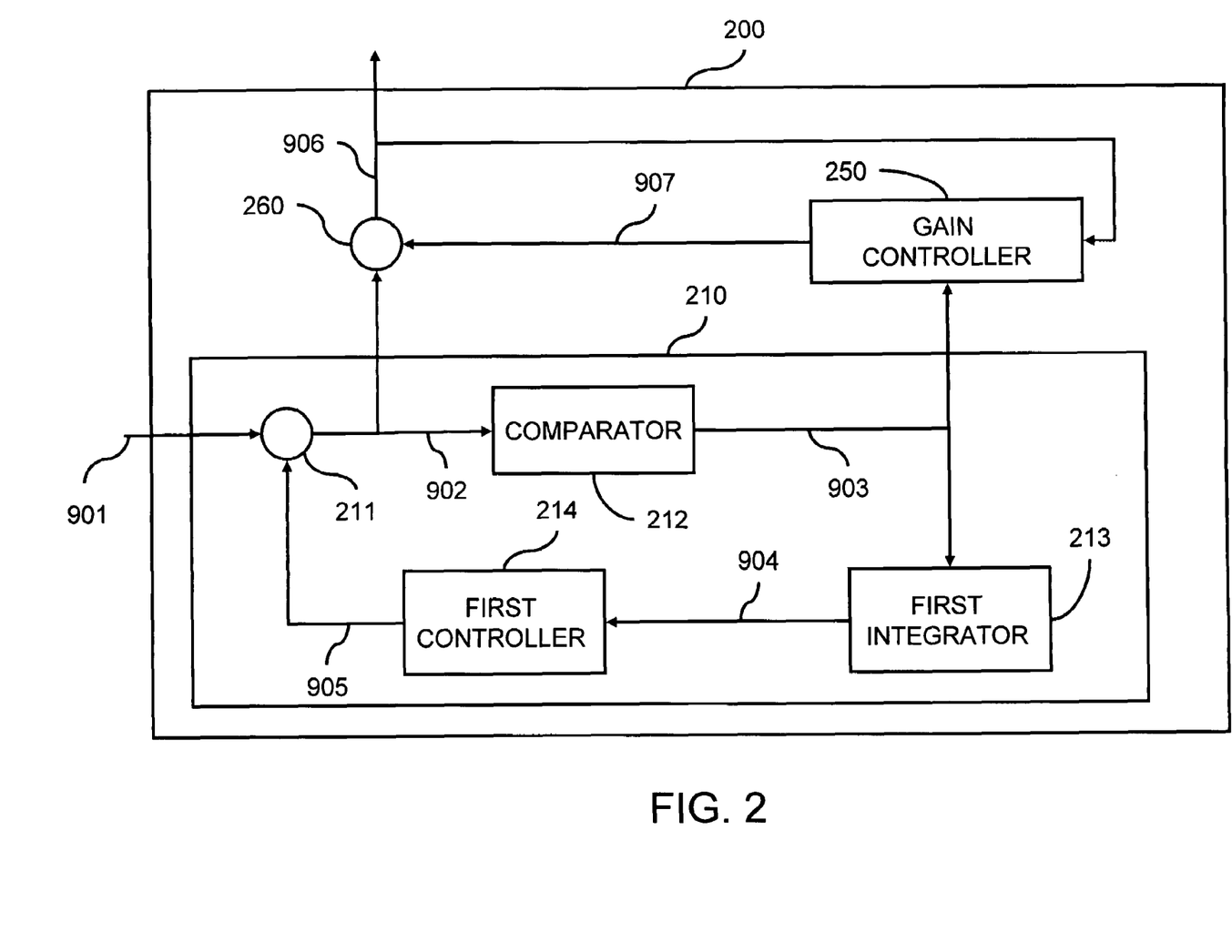
FIG. 2 is a block diagram of the asymmetry compensator according to the first embodiment of the invention.

Next, refer to FIG. 2 for the system block diagram of the asymmetric compensator 200 according to the first embodiment of the invention, including an adder 211, a comparator 212, a first integrator 213, a first controller 214, a gain controller 250, and a multiplier 270.

For a more detailed description, the adder 211 is used to add an offset signal 905 to the regenerating signal 901 read from the optical recording medium, thus to adjust its central level and generate an added signal 902. Thus the added signal 902 is the regenerating signal having its offset being adjusted. The comparator 212 is connected to the adder 211, and is used to determine whether the central level of the added signal 902 is greater or less than zero. When it is greater than zero, then the output determination signal 903 is 1; otherwise, the output determination signal is −1. The determination signal 903 is received by the gain controller 250 and a first integrator 213. The first integrator 213 is used to add the determination signal 903 successively and generate a corresponding first integration signal 904. The first controller 214 is connected to the first integrator 213, which is used to multiply the first integration signal 904 by a certain number, to generate the offset signal 905. The first controller 214 for example can be a P controller.

Figure 3:
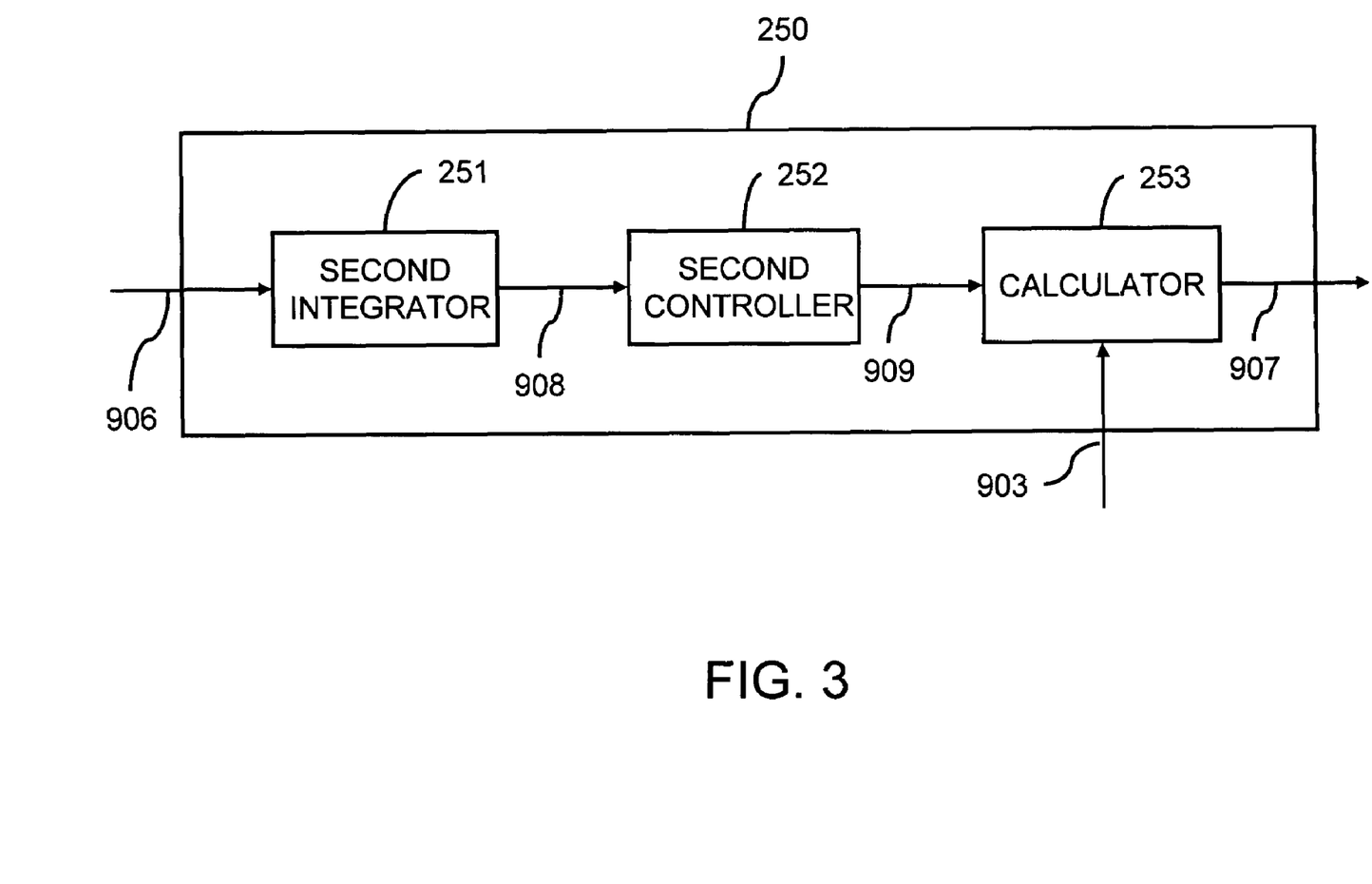
FIG. 3 is a block diagram of the gain controller of the asymmetry compensator according to the first embodiment of the invention.

Then, refer to FIG. 3 for the structure of the gain controller 250 corresponding to that as shown in FIG. 2. As shown in FIG. 3, the gain controller 250 is composed of a second integrator 251, a second controller 252, and a calculator 253, in which the second integrator 251 is used to add consecutively the regenerating signal 906 having no asymmetric component, thus generating a corresponding second integration signal 908. The second controller 252 is connected to the second integrator 251, which is utilized to multiply the second integration signal 908 by a specific number, to generate an operation signal 909. In the above description, the second controller 252 for example can be a P controller. The asymmetric gain signal 907 is generated from the operation signal 909 as based on the determination signal 903. When the determination signal is 1, the calculator 253 is used to subtract the operation signal 909 from 1 to obtain the asymmetric gain signal 907, and when the determination signal 903 is −1, the calculator 253 is used to add 1 to the operation signal 909 to obtain the asymmetric gain signal 907.

In the embodiment as shown in FIGS. 2 and 3, the regenerating signal 906 having no asymmetric component is used by the gain controller 250 as the feedback signal to calculate and generate the asymmetric gain signal 907 based on the determination signal 903, then the multiplier 260 is used to multiply the added signal 902 and the asymmetric gain signal 907, so as to generate and output the regenerating signal 906 not having the asymmetric component.

Figure 4:
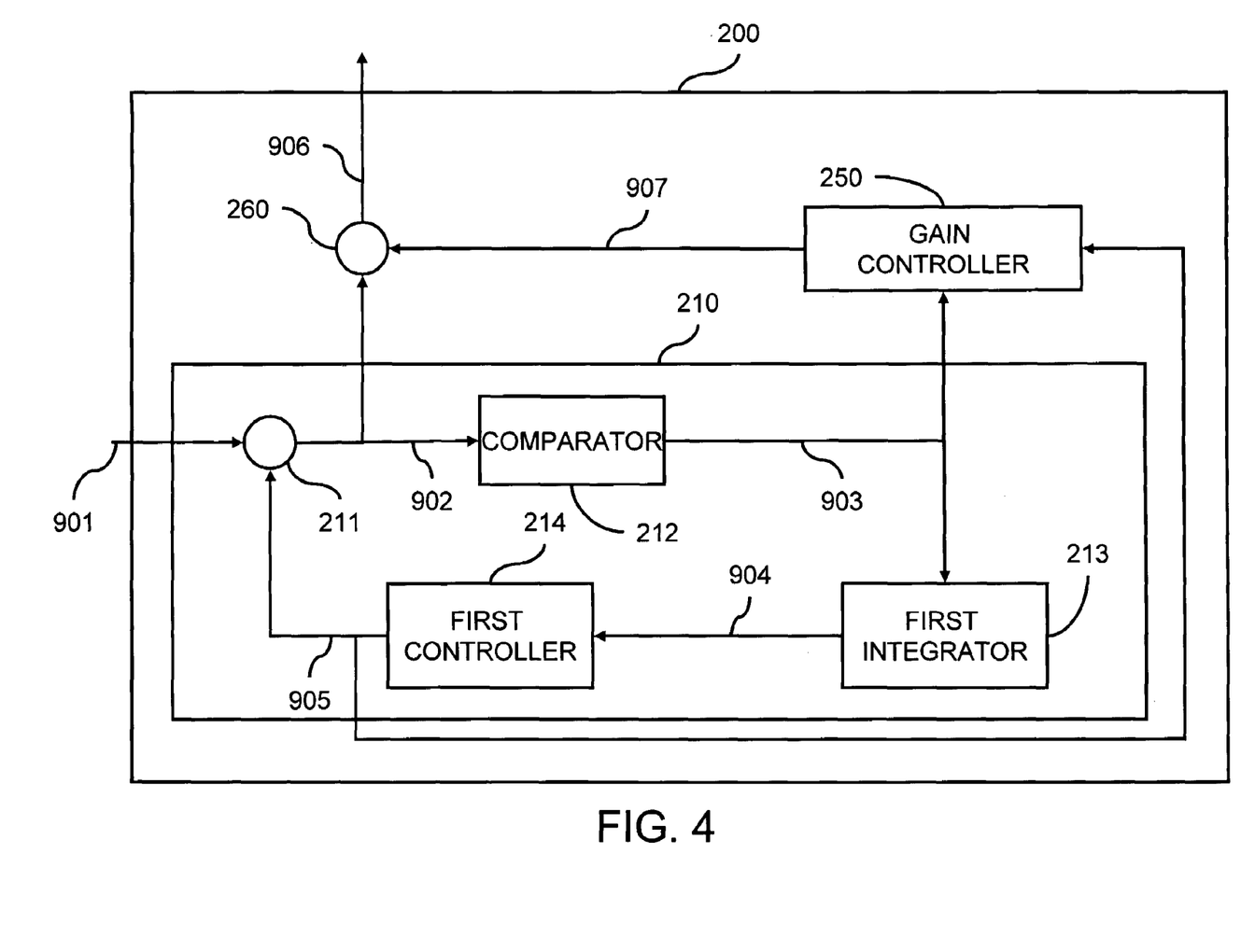
FIG. 4 is a block diagram of the asymmetry compensator according to the second embodiment of the invention.

Subsequently, refer to FIG. 4 for the system block diagram of the asymmetric compensator 200 according to the second embodiment of the invention, including: an adder 211, a comparator 212, an integrator 213, a controller 214, a gain controller 250, and a multiplier 270. The functions and the operations of the adder 211, the comparator 212, the integrator 213, the controller 214, and the multiplier 270 are the same as those of the first embodiment as shown in FIG. 2. The only difference is the gain controller 250, which will be described in detail as follows.

In this embodiment, the gain controller 250 is utilized to perform calculation by making use of the offset signal 905 and the amplitude of the regenerating signal 901 read from the optical recording medium, so as to output the asymmetric gain signal 907. When the determination signal 903 is 1, the calculator in the gain controller 250 is used to obtain the asymmetric gain signal 907 through dividing the amplitude of the regenerating signal 901, read from the optical recording medium by the result of the amplitude of the regenerating signal 901, read from the optical recording medium plus the offset signal 905. And when the determination signal 903 is −1, the calculator in the gain controller 250 is used to obtain the asymmetric gain signal 907 through dividing the amplitude of the regenerating signal 901, read from the optical recording medium by the result of the amplitude of the regenerating signal 901, read from the optical recording medium minus the offset signal 905.

The above-mentioned calculation may be expressed as the following mathematical equations.

When the determination signal 903 is 1, then the asymmetric gain signal 907 is: Asym_gain=Amp/(Amp+offset), wherein Amp indicates the amplitude of the regenerating signal 901, offset indicates the offset signal 905.

When the determination signal 903 is −1, then the asymmetric gain signal 907 is: Asym_gain=Amp/(Amp-offset), wherein Amp indicates the amplitude of the regenerating signal 901, offset indicates the offset 905.

Figure 5:
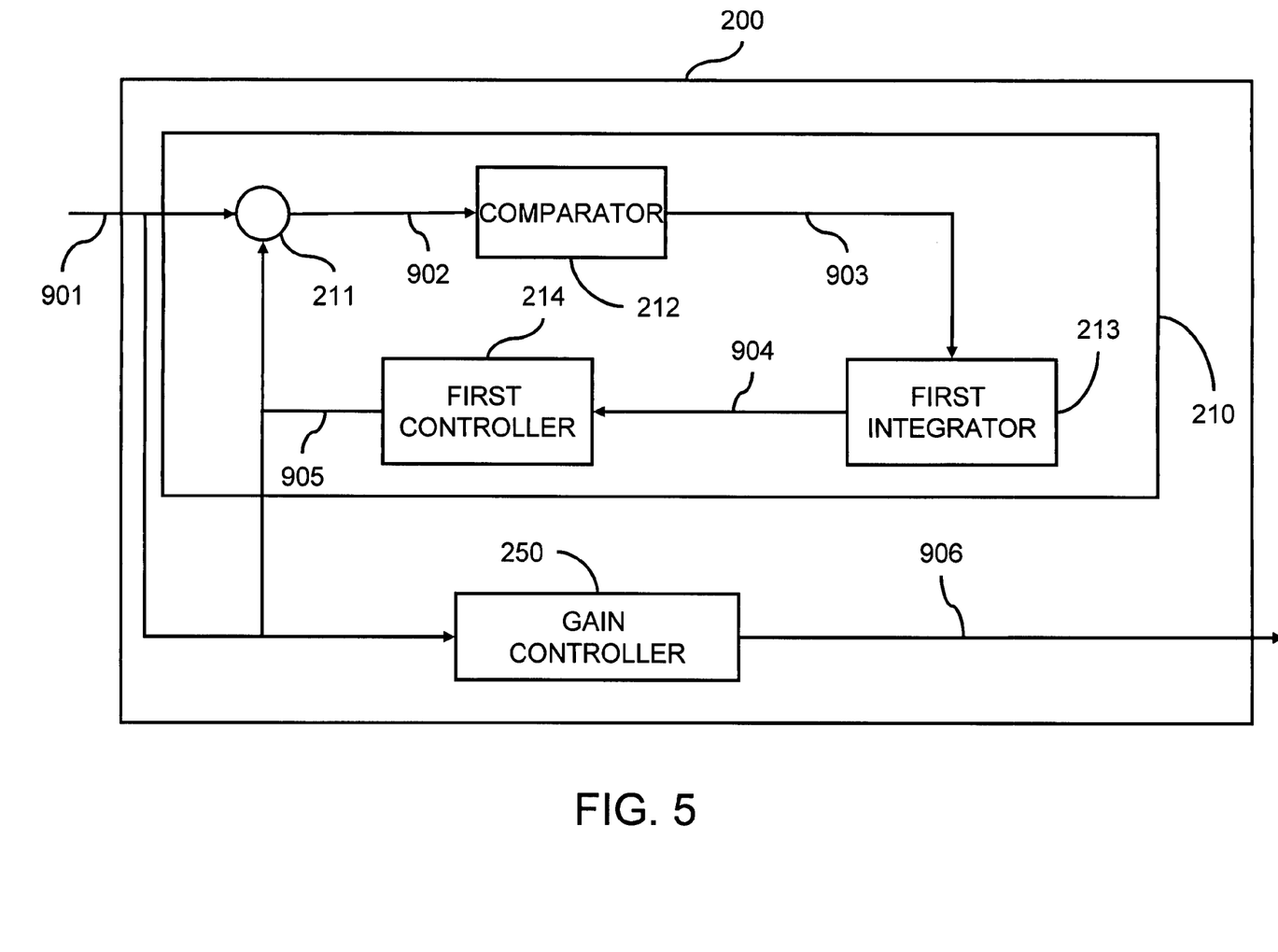
FIG. 5 is a block diagram of the asymmetry compensator according to the third embodiment of the invention.

Then, refer to FIG. 5 for the asymmetric compensator according to the third embodiment of the invention. In this embodiment, a corresponding table is established for the asymmetric compensator. From the table, the corresponding regenerating signal, not having the asymmetric component, can be obtained directly by its corresponding relations with the regenerating signal having the asymmetric component as read from the optical recording medium, in which the corresponding table is calculated from the amplitude and offset of the regenerating signal of the optical disk.

In FIG. 5, the asymmetric compensator as disclosed by the invention is composed of an adder 211, a comparator 212, an integrator 213, a controller 214, and a gain controller 250. Among them, the gain controller 250 is used to store a corresponding table indicating the corresponding relations between the regenerated signal having the asymmetric component, and the regenerating signal not having the asymmetric component. The functions and operations of the adder 211, the comparator 212, the integrator 213, and the controller 214 are the same as those as shown in FIG. 2 and the related first embodiment. The establishment of the corresponding table contained in the gain controller 250 will be described in detail as follows.

Figure 6:
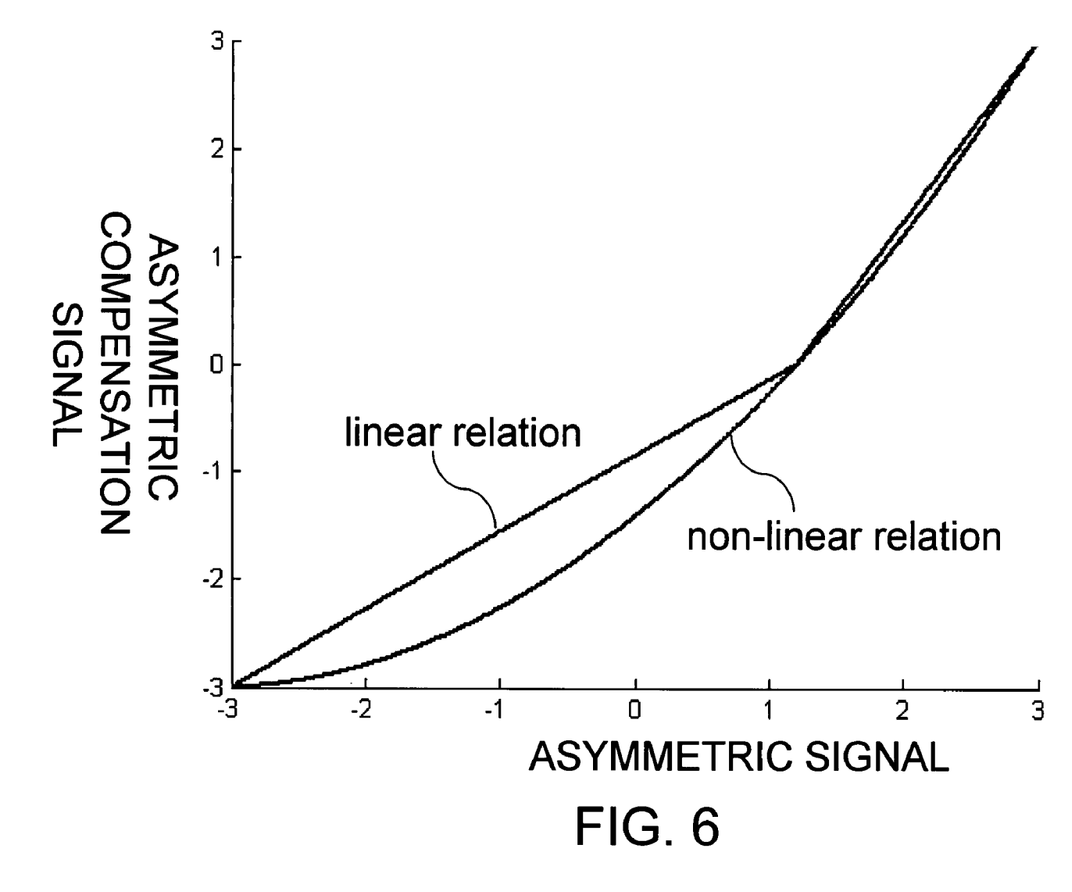
FIG. 6 is curves showing the corresponding relations specified in the corresponding table of the asymmetry compensator according to the invention.

Next, refer to FIG. 6 for the linear and curvature relations respectively between the regenerating signal having the asymmetric component and the regenerating signal not having the asymmetric component. As shown in FIG. 6, the relation can be a linear relation or a non-linear curvature relation, with its vertical axis (y axis) representing the asymmetric compensation signal, and its horizontal axis (x axis) representing the asymmetric signal.

The linear relation corresponding table is calculated and obtained by the equation y=ax+b; wherein, when x≦offset, then a=(amplitude/(amplitude+offset)), b=−a×offset; and when x≧offset, then a=(amplitude/(amplitude+−offset), b=−a×offset.

The non-linear relation corresponding table is calculated and obtained by the following quadratic equation. Assuming that $$y = ax^2 + bx + c, \text{ and}$$

$$\begin{bmatrix} a \\ b \\ c \end{bmatrix} = \begin{bmatrix} x_1^2 & x_1^1 & x_1^0 \\ as^2 & as^1 & as^0 \\ x_3^2 & x_3^1 & x_3^0 \end{bmatrix}^{-1} \times \begin{bmatrix} y_1 \\ y_2 \\ y_3 \end{bmatrix}$$

wherein x1,y1 represent amplitude, as represents the offset, x3,y3 represent negative amplitude, and y2 is 0.

Figure 7:
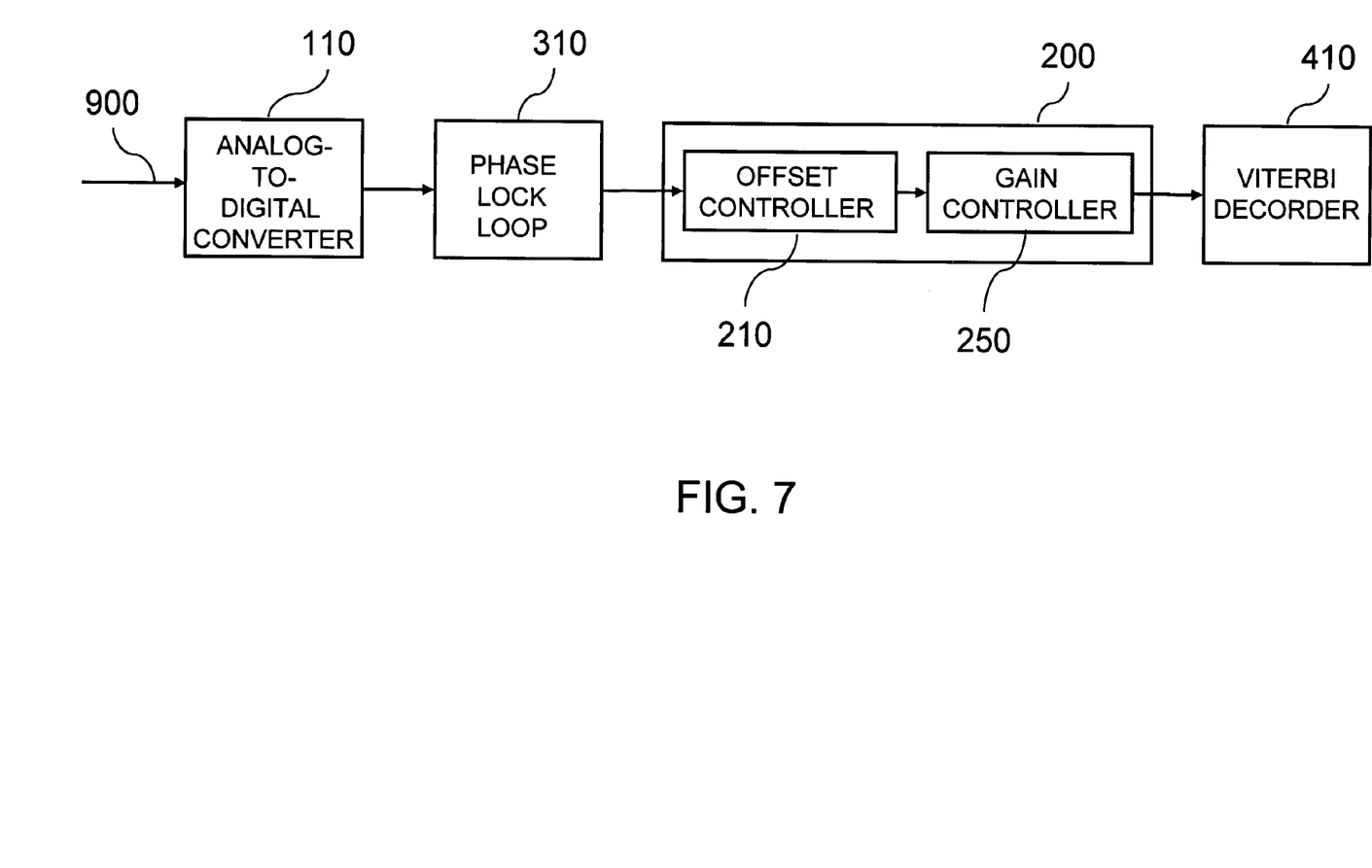
FIG. 7 is a system block diagram of the asymmetry compensator for a partial response maximum likelihood (PRML) decoder according to the fourth embodiment of the invention.

Furthermore, refer to FIG. 7 for the system block diagram of the Asymmetry Compensator for the Partial Response Maximum Likelihood (PRML) Decoder according to the fourth embodiment of the invention.

As shown in FIG. 7, it shows the system structure of the Partial Response Maximum Likelihood (PRML) Decoder, including: an analog-to-digital converter 110, an asymmetric compensator 200, a phase lock loop 310, and a VITERBI decoder 410. Firstly, the analog-to-digital converter 100 converter is utilized to convert the regenerating signal 900 read from the optical recording medium. The regenerating signal 900 read from the optical recording medium is of an analog format, which is converted to the regenerating signal 901 of the digital format through the analog-to-digital converter 100. Next, the regenerating signal 901 is phase looked by making use of the phase lock loop 310. Then, the phase-locked regenerating signal is removed from the asymmetric component through the asymmetric compensator 200. Finally, the regenerating signal is decoded through the VITERBI decoder 410.

Figure 8:
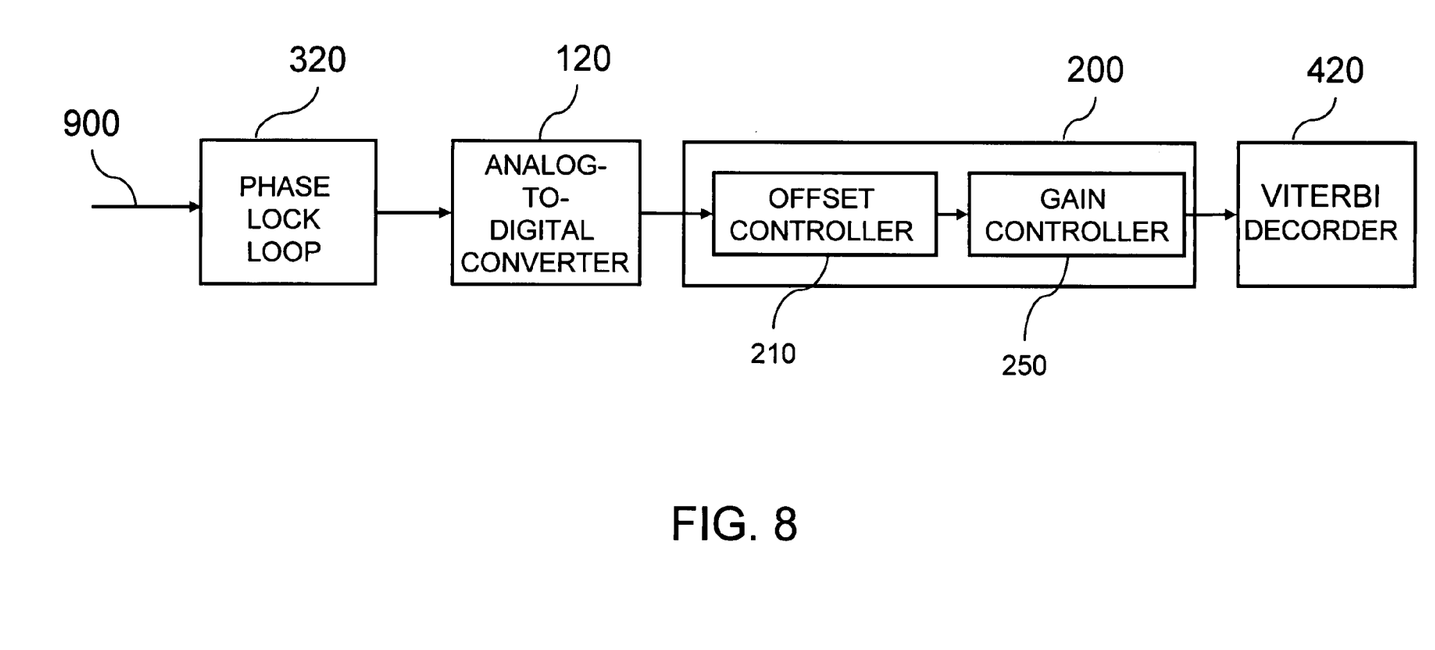
FIG. 8 is a system block diagram of the asymmetry compensator for a partial response maximum likelihood (PRML) decoder according to the fifth embodiment of the invention.

Moreover, refer to FIG. 8 for the system block diagram of the Asymmetry Compensator for Partial Response Maximum Likelihood (PRML) Decoder according to the fifth embodiment of the invention.

As shown in FIG. 8, it shows the system structure of the Partial Response Maximum Likelihood (PRML) Decoder, including: an analog-to-digital converter 120, an asymmetric compensator 200, a phase lock loop 320, and a VITERBI decoder 420. Firstly, the phase lock loop 320 is utilized to phase-lock the regenerated signal 900 read from the optical recording medium, then the signal is converted by the analog-to-digital converter 120 from the analog format to the digital format. Subsequently, the converted signal is removed of its asymmetric component by making use of the asymmetric compensator 200. And finally, the regenerating signal is decoded through the VITERBI decoder 420.

Figure 9:
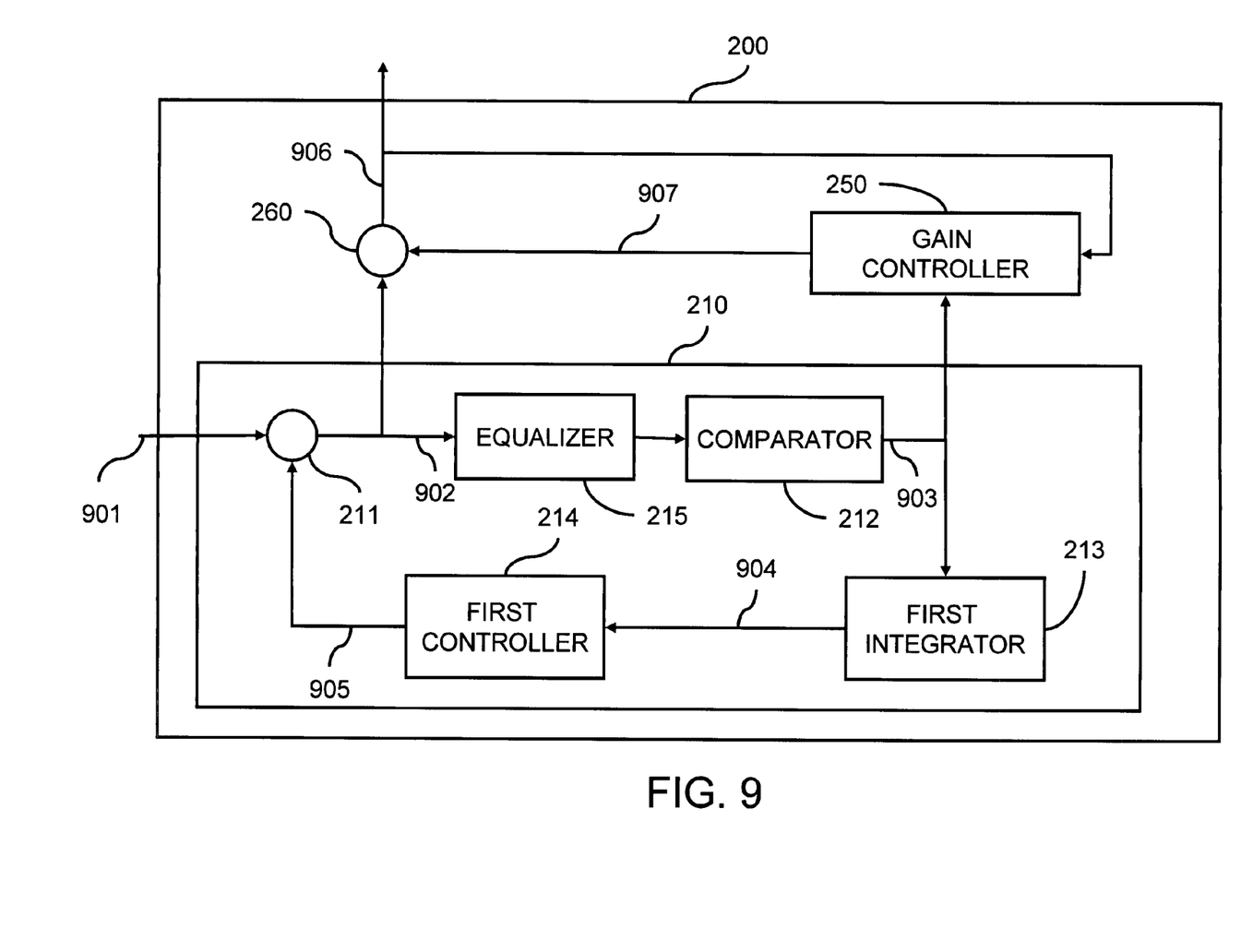
FIG. 9 is a block diagram of the asymmetry compensator according to the fifth embodiment of the invention.

In the above description, an offset controller 210 in the asymmetric compensator 200 is utilized to find the central level of the regenerating signal 901 through the control loop by making use of the principle of the digital sum of the regenerating signals, equaling to zero. As shown in FIG. 9, an equalizer 215 is added in the control loop of the offset controller 210, so as to increase the ratio of the high frequency portion in the added signal 902 deriving from the regenerating signal 901, thus solving the problem that certain portions of the regenerating signal don't pass the central level. In addition, the adjustment of the central level is more dependent on the high frequency portion of the regenerating signal of the optical disk, thus the addition of the equalizer can result in the increase of data decoding rate. Furthermore, the gain controller 250 is utilized to control the symmetry of the regenerating signal of the optical disk through the control loop by making use of the characteristics of the amplitude symmetry of the regenerating signal of the ideal optical disk.

As mentioned earlier, the purpose of adding an equalizer in front of the comparator 212 is to increase the proportion of the high frequency portion in the regenerated signal, so that the problem that certain portions of the regenerating signal don't pass the central level can be solved. The reason is that the adjustment of the central level is more dependant on the high frequency portion of the regenerating signal of the optical disk. Therefore, the data decoding rate can be increased by making use of the equalizer to raise the proportion of the high frequency portion of the regenerated signal, so as to adjust the high frequency gain of the regenerating signal, and raise the zero point detection capability of the offset controller.

Figure 10:
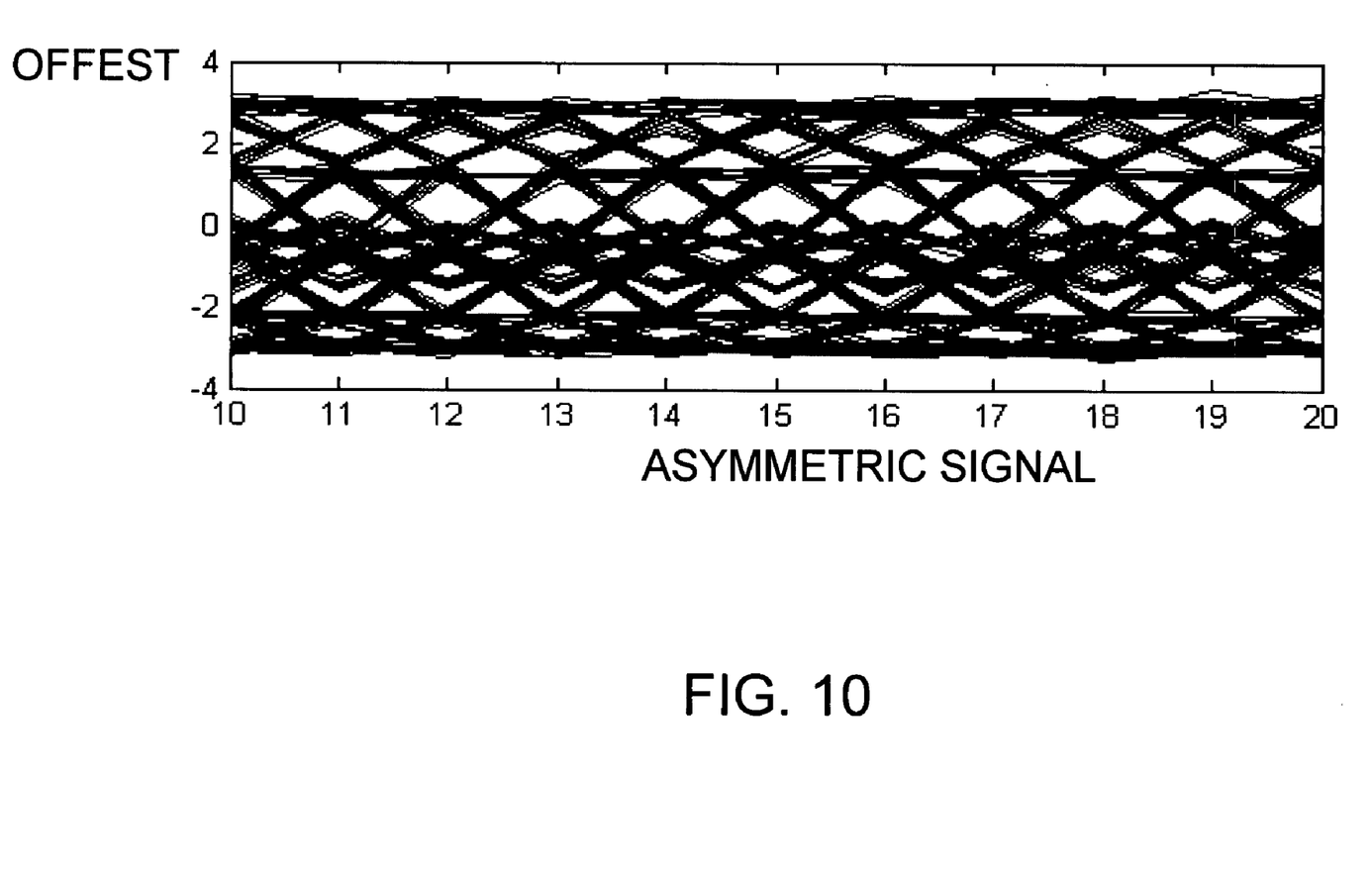
FIG. 10 is an eye pattern showing the offset of the asymmetry signal before the application of the asymmetry compensator of the invention.
Figure 11:
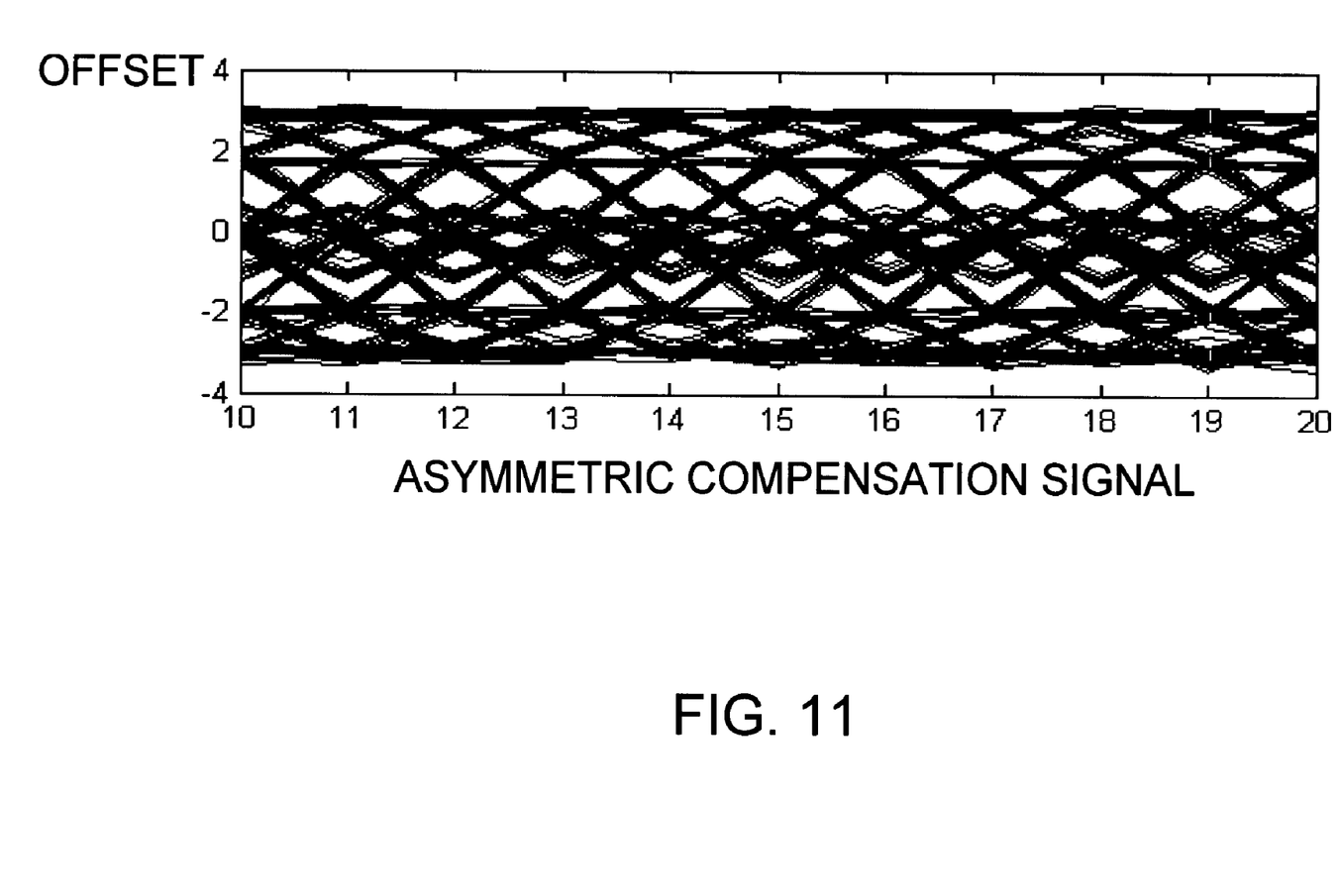
FIG. 11 is an eye pattern showing the offset of the compensated asymmetry signal after the application of the asymmetry compensator of the invention.
Figure 12:
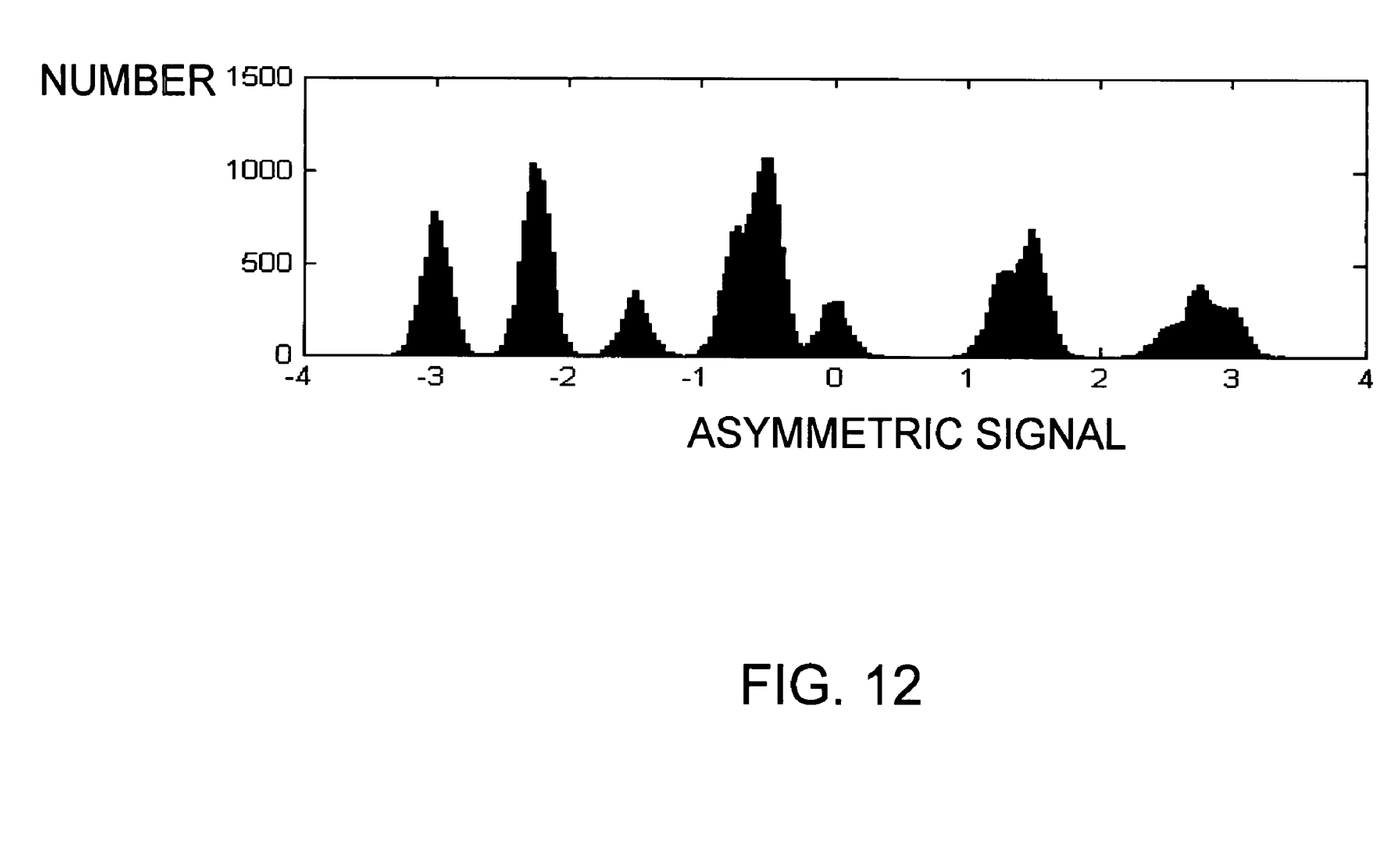
FIGS. 12 & 13 are the column charts corresponding to FIGS. 10 & 11 respectively showing the number of occurrences of the asymmetric signal and the compensated asymmetric signal before and after the application of the asymmetry compensator of the invention.
Figure 13:
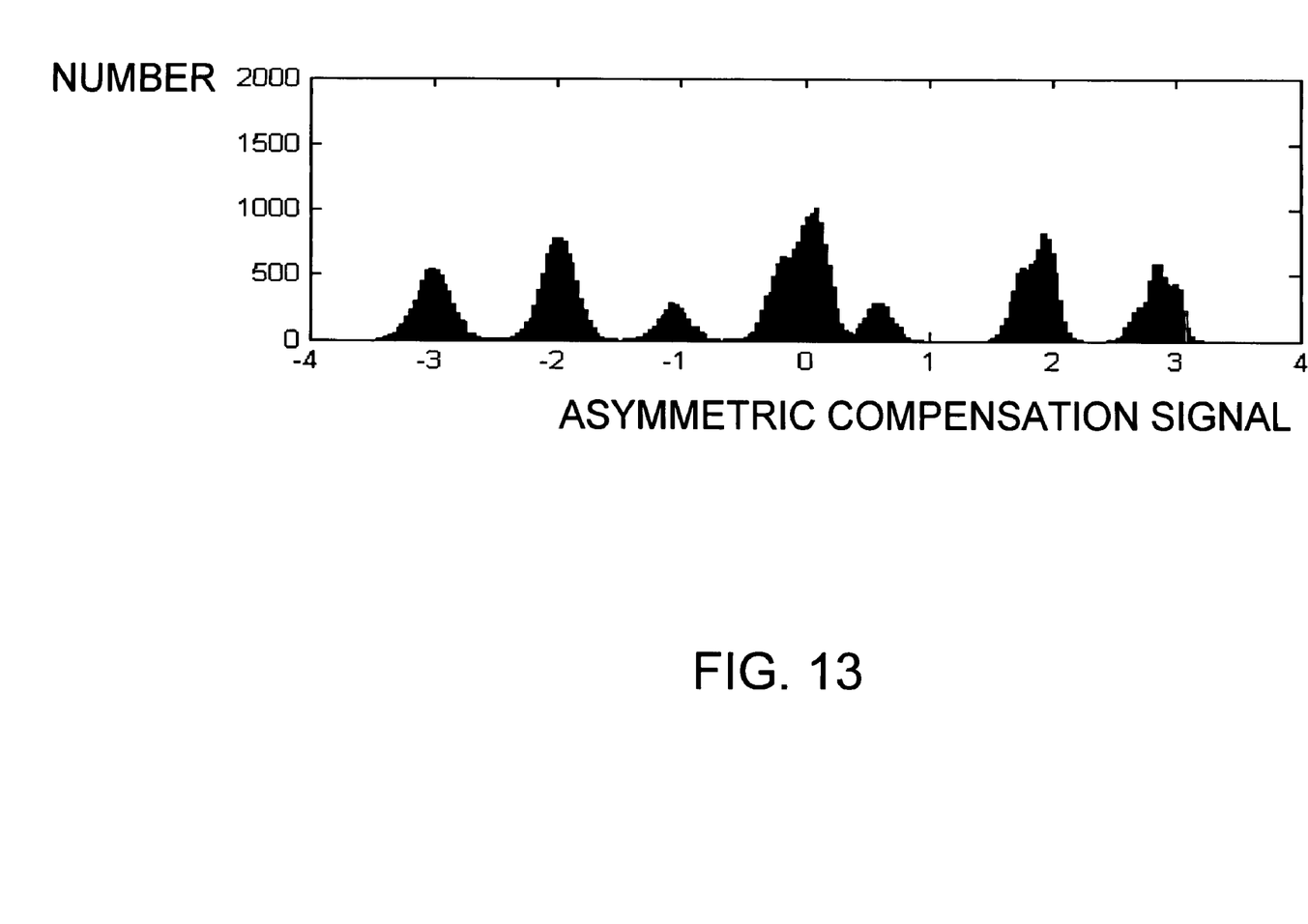

Finally, refer to FIGS. 10 and 11 for the eye patterns of the asymmetric signals and the compensated asymmetric signals. In addition, refer to FIGS. 12 and 13 for the column shape charts corresponding to FIGS. 10 and 11 respectively. From the above drawings, the effectiveness of the invention is evident, wherein, the asymmetric signal represents the regenerating signal of the optical disk entering the asymmetry compensator, of which about 25% is the asymmetric component, while the compensated asymmetric signal represents the regenerating signal of the optical disk output by the asymmetry compensator of the invention. From the drawings it is evident that the asymmetric component of the compensated asymmetric regenerated signal of the optical disk is significantly reduced.

Presently, the signal processing method utilized for the blue light optical disk regenerating signal (RF) is realized by means of the "Partial Response Maximum Likelihood (PRML) Decoder". Through the application of this method, the optical disk regenerating signal, having higher capacity and noise resistance, can be achieved. In the PRML structure, the RF optical disk regenerating signal can be modulated to the partial response model of the maximum likelihood (ML) through the utilization of the adaptive filter. However, in the present structure, only the linear feature of the RF optical disk regenerating signal is considered, yet the non-linear feature of the RF optical disk regenerating signal is treated as noise. The Asymmetry Compensator of the invention is mainly used to compensate for the non-linear feature of the asymmetry of the RF optical disk regenerating signal, which can be used to effectively restrain and reduce the asymmetry of the RF optical disk regenerating signal. Then, the signal thus processed is sent to the PRML decoder for decoding, thus achieving the reduction of the error occurrence rate of the signal.

Summing up the above, the signal asymmetry compensation steps of the invention may be classified mainly into the following two signal asymmetry compensation procedures. In the first signal asymmetry compensation procedure, the central level of the regenerating signal is located through the control loop by means of the principle of the digital sum value (DSV) of the signals equaling to zero, and proportion of the signal high frequency portion of the regenerating signal is increased through an additionally added equalizer, which is used to solve the problem of certain high frequency RF signals not passing the central level; moreover, the data decoding rate is increased due to the fact that the adjustment of the central level is more dependent on the high frequency portion of the RF optical disk regenerating signal. In the second signal asymmetry compensation procedure, the amplitude symmetry feature of the ideal optical disk regenerating signal is utilized to control and reduce the asymmetry of the optical disk regenerating signal through the control loop, thereby effectively solving the asymmetry problem of the optical disk regenerating signal.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An asymmetry compensator used in a partial response maximum likelihood (PRML) decoder, which is used to eliminate an asymmetric component in a regenerating signal read from an optical recording medium, comprising:

an offset controller arranged to determine a central level of said regenerating signal, and adjust an offset of said regenerating signal according to said central level, said offset controller including:

an adder for adding said regenerating signal read from said optical recording medium to said offset to generate an added signal, said added signal corresponds to the regenerating signal having the adjusted offset;

a comparator, connected to said adder, and arranged to determine whether a central level of said added signal is greater or less than 0, if it is greater than 0, then output the determination signal having a logic value 1, otherwise output the determination signal having a logic value −1;

a first integrator, used to receive said determination signal, and successively add said added signal to generate a corresponding first integration signal; and a first controller, used to multiply said first integration signal with a multiplier to generate said offset; and a gain controller, connected to said offset controller, and is arranged to adjust a gain of said regenerating signal thereby to output said regenerating signal without the asymmetric component, said gain controller including:

a second integrator, arranged to add successively the regenerating signal not having the asymmetric component, to generate a corresponding second integration signal;

a second controller, arranged to be connected to said second integrator, and multiply said second integration signal with a multiplier to generate an operation signal; and an calculator, arranged to output an asymmetric gain signal based on said determination signal and said operation signal, wherein, when the determination signal is 1, said calculator is arranged to subtract said operation signal from 1 to obtain said asymmetric gain signal, and when the determination signal is −1, said calculator is arranged to add 1 to said operation signal to obtain said asymmetric gain signal.

2. The asymmetry compensator of claim 1, wherein said first controller is a P controller.

3. The asymmetry compensator of claim 1, wherein said second controller is a P controller.

4. The asymmetry compensator of claim 1, wherein said offset controller further comprising an equalizer, which is connected to said adder thus to equalize said added signal output from said adder, and output said equalized signal to said first integrator.

5. The asymmetry compensator of claim 1, further comprising a multiplier, arranged to output said regenerating signal having said asymmetric component based on said asymmetric gain signal and said added signal.

6. The asymmetry compensator of claim 1, wherein said gain controller is arranged to operate by making use of said offset and the amplitude of said regenerating signal read from the optical recording medium thus to output an asymmetric gain signal; wherein, when said determination signal is 1, said gain controller is arranged to divide the amplitude of said regenerating signal read from the optical recording medium by the result of the amplitude of said regenerating signal read from the optical recording medium minus said offset thus to obtain the said asymmetric gain signal; and when said determination signal is −1, said gain controller is arranged to divide the amplitude of said regenerating signal read from the optical recording medium by the result of the amplitude of said regenerating signal read from the optical recording medium plus said offset thus to obtain the said asymmetric gain signal.

7. The asymmetry compensator of claim 6, further comprising a multiplier, arranged to output said regenerating signal not having said asymmetric component based on said asymmetric gain signal and said added signal.

8. The asymmetry compensator of claim 1, wherein a corresponding table is stored in said gain controller, in which is specified the corresponding relations between the regenerating signal having said asymmetric component and the regenerating signal not having said asymmetric component.

9. The asymmetry compensator of claim 8, wherein said corresponding relation is represented by a linear equation.

10. The asymmetry compensator of claim 8, wherein said corresponding relation is represented by a non-linear equation.

11. The asymmetry compensator of claim 10, wherein said non-linear equation is a quadratic equation.

12. An asymmetry compensating method used in a partial response maximum likelihood (PRML) decoder, which is used to eliminate an asymmetric component in a regenerating signal read from an optical recording medium, the method comprising:

determining a central level of said regenerating signal, and adjust an offset of said regenerating signal according to said central level, the determining step including:

adding said regenerating signal read from said optical recording medium to said offset to generate an added signal, said added signal corresponds to the regenerating signal having the adjusted offset;

determining whether a central level of said added signal is greater or less than 0, if it is greater than 0, then output the determination signal having a logic value 1, otherwise output the determination signal having a logic value −1;

adding said added signal to the determination signal to generate a corresponding first integration signal; and multiplying said first integration signal with a multiplier to generate said offset; and adjusting a gain of said regenerating signal thereby to output said regenerating signal without the asymmetric component, the adjusting step including:

adding the regenerating signal not having the asymmetric component, to generate a corresponding second integration signal;

multiplying said second integration signal with a multiplier to generate an operation signal; and outputting an asymmetric gain signal based on said determination signal and said operation signal, wherein, when the determination signal is 1, subtracting said operation signal from 1 to obtain said asymmetric gain signal, and when the determination signal is −1, adding 1 to said operation signal to obtain said asymmetric gain signal.

* * * * *